US010383128B2

(12) United States Patent
Kosseifi et al.

(10) Patent No.: US 10,383,128 B2
(45) Date of Patent: *Aug. 13, 2019

(54) ASSIGNMENT OF HIERARCHICAL CELL STRUCTURES EMPLOYING GEOLOCATION TECHNIQUES

(71) Applicant: AT&T MOBILITY II LLC, Atlanta, GA (US)

(72) Inventors: Mario Kosseifi, Roswell, GA (US); Sheldon K. Meredith, Marietta, GA (US); Lakshman Sundeep Myneni, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,942

(22) Filed: Jun. 13, 2018

(65) Prior Publication Data

US 2018/0302893 A1    Oct. 18, 2018

Related U.S. Application Data

(63) Continuation of application No. 15/131,793, filed on Apr. 18, 2016, now Pat. No. 10,039,111, which is a (Continued)

(51) Int. Cl.
*H04W 72/04* (2009.01)
*H04W 36/32* (2009.01)
(Continued)

(52) U.S. Cl.
CPC ......... *H04W 72/048* (2013.01); *H04W 4/025* (2013.01); *H04W 16/32* (2013.01); *H04W 36/32* (2013.01); *H04W 36/00837* (2018.08)

(58) Field of Classification Search
CPC ..... H04W 4/025; H04W 16/32; H04W 36/32; H04W 72/048; H04W 36/00837
See application file for complete search history.

(56) References Cited

U.S. PATENT DOCUMENTS

| 4,718,081 A | 1/1988 | Brenig |
| 5,515,062 A | 5/1996 | Maine et al. |
(Continued)

FOREIGN PATENT DOCUMENTS

EP    2999241    3/2016

OTHER PUBLICATIONS

Office Action dated Nov. 27, 2018 for U.S. Appl. No. 15/629,366, 35 pages.
(Continued)

*Primary Examiner* — Wayne H Cai
(74) *Attorney, Agent, or Firm* — Amin, Turocy & Watson, LLP

(57) ABSTRACT

Distance is employed to facilitate sector selection and re-selection in a network during handoff. A system receives measurement information for a mobile device. The measurement information includes information indicative of a geographical location of the mobile device. The system determines information indicative of a geographical location of a cell site to which the mobile device is assigned. The system then selects a sector of the cell site with which to associate the mobile device. The selection of the sector is based, at least, on a distance determined between the mobile device and the cell site. In various embodiments, the distance information is determined based on the latitude and longitude of the mobile device. In various embodiments, the morphology of the terrain for the area in which the mobile device is located is factored into the determination of the sector.

20 Claims, 10 Drawing Sheets

Related U.S. Application Data continuation of application No. 13/557,425, filed on Jul. 25, 2012, now Pat. No. 9,351,223.

(51) Int. Cl.
*H04W 4/02* (2018.01)
*H04W 16/32* (2009.01)
*H04W 36/00* (2009.01)

(56) References Cited

U.S. PATENT DOCUMENTS

| | | | |
|---|---|---|---|
| 5,724,660 A | 3/1998 | Kauser et al. |
| 5,732,354 A | 3/1998 | MacDonald |
| 5,732,383 A | 3/1998 | Foladare et al. |
| 5,831,545 A | 11/1998 | Murray et al. |
| 5,844,521 A | 12/1998 | Stephens et al. |
| 5,982,324 A | 11/1999 | Watters et al. |
| 6,018,312 A | 1/2000 | Haworth |
| 6,026,301 A | 2/2000 | Satarasinghe |
| 6,058,260 A | 5/2000 | Brockel et al. |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,292,665 B1 | 9/2001 | Hildebrand et al. |
| 6,298,233 B1 | 10/2001 | Souissi et al. |
| 6,307,503 B1 | 10/2001 | Liu |
| 6,311,078 B1 | 10/2001 | Hardouin |
| 6,317,686 B1 | 11/2001 | Ran |
| 6,321,092 B1 | 11/2001 | Fitch et al. |
| 6,330,459 B1 | 12/2001 | Crichton et al. |
| 6,351,235 B1 | 2/2002 | Stilp |
| 6,353,778 B1 | 3/2002 | Brown |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri |
| 6,594,576 B2 | 7/2003 | Fan et al. |
| 6,604,083 B1 | 8/2003 | Bailey |
| 6,668,226 B2 | 12/2003 | Sutanto |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,915,123 B1 | 7/2005 | Daudelin et al. |
| 6,933,100 B2 | 8/2005 | Igawa et al. |
| 6,933,860 B1 | 8/2005 | Gehman |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,203,752 B2 | 4/2007 | Rice et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec et al. |
| 7,664,492 B1 | 2/2010 | Lee et al. |
| 7,696,922 B2 | 4/2010 | Nicholson et al. |
| 7,697,917 B2 | 4/2010 | Camp, Jr. et al. |
| 7,706,964 B2 | 4/2010 | Horvitz et al. |
| 7,744,740 B2 | 6/2010 | Diehl |
| 7,747,258 B2 | 6/2010 | Farmer |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho |
| 8,050,690 B2 | 11/2011 | Neeraj |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera |
| 8,295,854 B2 | 10/2012 | Osann, Jr. |
| 8,300,663 B2 | 10/2012 | Chion et al. |
| 8,307,030 B1 | 11/2012 | Hu |
| 8,326,682 B2 | 12/2012 | Redford et al. |
| 8,355,364 B1 * | 1/2013 | Vargantwar ............ H04W 4/02 370/254 |
| 8,355,865 B2 | 1/2013 | Wagner et al. |
| 8,402,356 B2 | 3/2013 | Martinez et al. |
| 8,417,264 B1 | 4/2013 | Whitney et al. |
| 8,437,790 B1 | 5/2013 | Hassan et al. |
| 8,464,164 B2 | 6/2013 | Hon et al. |
| 8,469,274 B2 | 6/2013 | Tseng et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes, Jr. |
| 8,612,410 B2 | 12/2013 | Meredith et al. |
| 8,666,388 B2 | 3/2014 | Catovic et al. |
| 8,666,390 B2 | 3/2014 | Meredith et al. |
| 8,761,799 B2 | 6/2014 | Meredith et al. |
| 8,768,348 B2 | 7/2014 | Stuempert et al. |
| 8,897,805 B2 | 11/2014 | Fix et al. |
| 8,909,247 B2 | 12/2014 | Tipton et al. |
| 8,923,134 B2 | 12/2014 | Meredith et al. |
| 8,929,827 B2 | 1/2015 | Fix et al. |
| 9,002,373 B2 | 4/2015 | Marti et al. |
| 9,008,684 B2 | 4/2015 | Tipton et al. |
| 9,008,698 B2 | 4/2015 | Meredith et al. |
| 9,053,513 B2 | 6/2015 | Meredith et al. |
| 9,066,227 B2 | 6/2015 | Spencer et al. |
| 9,100,891 B2 | 8/2015 | Zheng et al. |
| 9,137,772 B2 | 9/2015 | Hazzani et al. |
| 9,196,157 B2 | 11/2015 | Hardin et al. |

(56) References Cited

U.S. PATENT DOCUMENTS

| | | |
|---|---|---|
| 9,232,399 B2 | 1/2016 | Tipton et al. |
| 9,351,111 B1 | 5/2016 | Kaufman et al. |
| 9,473,904 B2 | 10/2016 | Bennett |
| 9,510,355 B2 | 11/2016 | Meredith et al. |
| 9,519,043 B2 | 12/2016 | Fix et al. |
| 9,537,950 B2 | 1/2017 | Ibasco et al. |
| 9,564,962 B2 | 2/2017 | Yarnold et al. |
| 9,596,671 B2 | 3/2017 | Fix et al. |
| 9,667,660 B2 | 5/2017 | Tipton et al. |
| 9,723,446 B2 | 8/2017 | Fix et al. |
| 9,769,615 B2 | 9/2017 | Fix et al. |
| 9,769,623 B2 | 9/2017 | Fix et al. |
| 9,807,250 B2 | 10/2017 | Austin et al. |
| 9,810,765 B2 | 11/2017 | Fix et al. |
| 9,813,900 B2 | 11/2017 | Meredith et al. |
| 9,858,575 B2 | 1/2018 | Meredith et al. |
| 10,084,824 B2 | 9/2018 | Tipton et al. |
| 2001/0047242 A1 | 11/2001 | Ohta |
| 2002/0059266 A1 | 5/2002 | I'Anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0040323 A1 | 2/2003 | Pihl et al. |
| 2003/0092448 A1 | 5/2003 | Forstrom et al. |
| 2003/0095065 A1 | 5/2003 | Ericson et al. |
| 2003/0097330 A1 | 5/2003 | Hillmer et al. |
| 2003/0115228 A1 | 6/2003 | Horvitz et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0023664 A1 | 2/2004 | Mirouze et al. |
| 2004/0024639 A1 | 2/2004 | Goldman et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267410 A1 | 12/2004 | Duni et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0043037 A1 | 2/2005 | Ioppe et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0143292 A1 | 6/2006 | Taubenheim et al. |
| 2006/0200303 A1 | 9/2006 | Fuentes et al. |
| 2006/0233133 A1 | 10/2006 | Liu et al. |
| 2006/0240839 A1 | 10/2006 | Chen et al. |
| 2006/0240841 A1 | 10/2006 | Bhattacharya |
| 2006/0246918 A1 | 11/2006 | Fok et al. |
| 2006/0267841 A1 | 11/2006 | Lee et al. |
| 2006/0270419 A1 | 11/2006 | Crowly et al. |
| 2006/0276168 A1 | 12/2006 | Fuller, Jr. et al. |
| 2006/0282660 A1 | 12/2006 | Varghese et al. |
| 2007/0001873 A1 | 1/2007 | Ishikawa et al. |
| 2007/0049286 A1 | 3/2007 | Kim et al. |
| 2007/0060130 A1 | 3/2007 | Gogic et al. |
| 2007/0088818 A1 | 4/2007 | Roberts et al. |
| 2007/0121560 A1 | 5/2007 | Edge |
| 2007/0149214 A1 | 6/2007 | Walsh et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0032705 A1 | 2/2008 | Patel et al. |
| 2008/0039114 A1 | 2/2008 | Phatak et al. |
| 2008/0056193 A1 | 3/2008 | Bourlas et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0127354 A1 | 5/2008 | Carpenter et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0005064 A1 | 1/2009 | Malik et al. |
| 2009/0017823 A1 | 1/2009 | Sachs et al. |
| 2009/0024546 A1 | 1/2009 | Ficcaglia et al. |
| 2009/0028082 A1 | 1/2009 | Wynn et al. |
| 2009/0052330 A1 | 2/2009 | Matsunaga et al. |
| 2009/0063030 A1 | 3/2009 | Howarter et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren |
| 2009/0125380 A1 | 5/2009 | Otto et al. |
| 2009/0131073 A1 | 5/2009 | Carlson et al. |
| 2009/0161599 A1 | 6/2009 | Haartsen et al. |
| 2009/0177382 A1 | 7/2009 | Alles et al. |
| 2009/0181695 A1 | 7/2009 | Wirola et al. |
| 2009/0227265 A1 | 9/2009 | Kang et al. |
| 2009/0234876 A1 | 9/2009 | Schigel et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0312005 A1 | 12/2009 | Mukundan et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0056179 A1 | 3/2010 | Gaenger et al. |
| 2010/0058442 A1 | 3/2010 | Costa et al. |
| 2010/0081389 A1 | 4/2010 | Lawrow et al. |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0122314 A1 | 5/2010 | Zhang et al. |
| 2010/0124886 A1 | 5/2010 | Fordham et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi |
| 2010/0163632 A1 | 7/2010 | Tseng et al. |
| 2010/0172259 A1 | 7/2010 | Aggarwal et al. |
| 2010/0180039 A1 | 7/2010 | Oh et al. |
| 2010/0189236 A1 | 7/2010 | MacDonald et al. |
| 2010/0190509 A1 | 7/2010 | Davis et al. |
| 2010/0195566 A1 | 8/2010 | Krishnamurthy et al. |
| 2010/0203903 A1 | 8/2010 | Dingier et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0313157 A1 | 10/2010 | Carlsson et al. |
| 2010/0291907 A1 | 11/2010 | MacNaughtan et al. |
| 2010/0296467 A1 | 11/2010 | Pelletier et al. |
| 2010/0299060 A1 | 11/2010 | Snavely et al. |
| 2010/0311437 A1 | 12/2010 | Palanki et al. |

(56) References Cited

U.S. PATENT DOCUMENTS

| | | | |
|---|---|---|---|
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0026475 A1 | 2/2011 | Lee et al. |
| 2011/0026495 A1 | 2/2011 | Lee et al. |
| 2011/0028129 A1 | 2/2011 | Hutchison et al. |
| 2011/0039593 A1 | 2/2011 | Lee et al. |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0069668 A1 | 3/2011 | Chion et al. |
| 2011/0072034 A1 | 3/2011 | Sly et al. |
| 2011/0076975 A1 | 3/2011 | Kim et al. |
| 2011/0077030 A1 | 3/2011 | Wigren et al. |
| 2011/0077032 A1 | 3/2011 | Correale et al. |
| 2011/0099047 A1 | 4/2011 | Weiss et al. |
| 2011/0106416 A1 | 5/2011 | Scofield et al. |
| 2011/0130135 A1 | 6/2011 | Trigui |
| 2011/0151839 A1 | 6/2011 | Bolon et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0287801 A1 | 11/2011 | Levin et al. |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0069386 A1 | 3/2012 | St. Laurent et al. |
| 2012/0087338 A1 | 4/2012 | Brandt et al. |
| 2012/0099621 A1 | 4/2012 | Karlsson et al. |
| 2012/0115505 A1 | 5/2012 | Miyake et al. |
| 2012/0139782 A1 | 6/2012 | Gutt et al. |
| 2012/0144452 A1 | 6/2012 | Dyor et al. |
| 2012/0144457 A1 | 6/2012 | Counterman |
| 2012/0158289 A1 | 6/2012 | Bernheim Brush et al. |
| 2012/0182180 A1 | 7/2012 | Wolf et al. |
| 2012/0182874 A1 | 7/2012 | Siomina et al. |
| 2012/0185309 A1 | 7/2012 | Kakarla et al. |
| 2012/0214509 A1 | 8/2012 | Levin et al. |
| 2012/0221232 A1 | 8/2012 | Shang et al. |
| 2012/0253656 A1 | 10/2012 | Brandt |
| 2012/0276900 A1* | 11/2012 | Stephens ............ H04W 24/02 455/436 |
| 2012/0282924 A1 | 11/2012 | Tagg et al. |
| 2012/0286997 A1 | 11/2012 | Lin et al. |
| 2012/0287911 A1 | 11/2012 | Takano et al. |
| 2012/0302254 A1 | 11/2012 | Charbit et al. |
| 2012/0317500 A1 | 12/2012 | Kosseifi et al. |
| 2012/0323703 A1 | 12/2012 | Hillier et al. |
| 2012/0327869 A1 | 12/2012 | Wang et al. |
| 2013/0007058 A1 | 1/2013 | Meredith et al. |
| 2013/0023237 A1 | 1/2013 | Meredith et al. |
| 2013/0023247 A1 | 1/2013 | Bolon et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0066748 A1 | 3/2013 | Long |
| 2013/0095861 A1 | 4/2013 | Li et al. |
| 2013/0096966 A1 | 4/2013 | Barnes |
| 2013/0109407 A1 | 5/2013 | Tipton et al. |
| 2013/0114464 A1 | 5/2013 | Tarraf et al. |
| 2013/0122863 A1 | 5/2013 | Chen et al. |
| 2013/0137464 A1 | 5/2013 | Kramer et al. |
| 2013/0150053 A1* | 6/2013 | Hwang ............ H04W 36/0083 455/440 |
| 2013/0226451 A1 | 8/2013 | O'Neill et al. |
| 2013/0267242 A1 | 10/2013 | Curticapean et al. |
| 2013/0281111 A1 | 10/2013 | Syrjarinne et al. |
| 2013/0288704 A1 | 10/2013 | Wirola et al. |
| 2013/0310075 A1 | 11/2013 | Lim et al. |
| 2013/0324149 A1 | 12/2013 | Fix et al. |
| 2013/0337824 A1 | 12/2013 | Meredith et al. |
| 2013/0337826 A1 | 12/2013 | Fix et al. |
| 2014/0062782 A1 | 3/2014 | Abraham |
| 2014/0106779 A1 | 4/2014 | Arslan et al. |
| 2014/0122220 A1 | 5/2014 | Bradley et al. |
| 2014/0171060 A1 | 6/2014 | Cook et al. |
| 2014/0278744 A1 | 9/2014 | Lo Faro et al. |
| 2014/0295881 A1 | 10/2014 | Werner et al. |
| 2014/0365488 A1 | 12/2014 | Arslan et al. |
| 2015/0011249 A1 | 1/2015 | Siliski et al. |
| 2015/0098712 A1 | 4/2015 | Li et al. |
| 2015/0147997 A1 | 5/2015 | Shaw et al. |
| 2015/0324718 A1 | 11/2015 | Lord et al. |
| 2016/0321642 A1 | 11/2016 | Kaufman et al. |
| 2017/0280317 A1 | 9/2017 | Tagg et al. |
| 2017/0318428 A1 | 11/2017 | Wang et al. |

OTHER PUBLICATIONS

Office Action dated Sep. 24, 2018 for U.S. Appl. No. 15/996,203, 21 pages.

Notice of Allowance dated Oct. 19, 2018 for U.S. Appl. No. 14/704,949, 24 pages.

Ouyang, Y. & Fallah, M. H., "The Impact of Cell Site Re-homing on the Performance of UMTS Core Networks", International Journal of Next Generation Network (IJ NGN), vol. 2, No. 1, Mar. 2010.

Office Action dated Nov. 8, 2018 for U.S. Appl. No. 14/881,335, 68 pages.

Office Action dated Nov. 19, 2018 for U.S. Appl. No. 16/108,060, 27 pages.

Non-Final Office Action dated Dec. 28, 2011 for U.S. Appl. No. 12/836,471, 34 pages.

Non-Final Office Action dated Feb. 23, 2012 for U.S. Appl. No. 12/967,747, 31 pages.

Non-Final Office Action dated Dec. 15, 2011 for U.S. Appl. No. 12/712,424, 34 pages.

Non-Final Office Action dated Apr. 13, 2012 for U.S. Appl. No. 12/416,853, 36 pages.

Non-Final Office Action dated Oct. 2, 2012 for U.S. Appl. No. 13/554,285, 19 pages.

Non-Final Office Action dated Aug. 30, 2012 for U.S. Appl. No. 12/958,146, 40 pages.

Final Office Action dated Jul. 30, 2012 for U.S. Appl. No. 12/967,747, 28 pages.

Non-Final Office Action dated Jul. 17, 2012 for U.S. Appl. No. 13/220,083, 57 pages.

Non-Final Office Action dated Sep. 11, 2012 for U.S. Appl. No. 13/188,345, 44 pages.

Non-Final Office Action dated Oct. 15, 2012 for U.S. Appl. No. 13/523,778, 21 pages.

Final Office Action dated Dec. 20, 2012 for U.S. Appl. No. 12/958,146, 23 pages.

Non-Final Office Action dated Dec. 28, 2012 for U.S. Appl. No. 13/188,295, 37 pages.

Non-Final Office Action dated Jan. 3, 2013 for U.S. Appl. No. 13/188,300, 36 pages.

Non-Final Office Action dated Nov. 8, 2012 for U.S. Appl. No. 13/204,535, 30 pages.

Final Office Action dated Jan. 25, 2013 for U.S. Appl. No. 13/554,285, 20 pages.

Non-Final Office Action dated Mar. 19, 2013 for U.S. Appl. No. 13/174,541, 46 pages.

(56) References Cited

OTHER PUBLICATIONS

Final Office Action dated Feb. 13, 2013 for U.S. Appl. No. 13/220,083, 48 pages.
Final Office Action dated Feb. 22, 2013 for U.S. Appl. No. 13/188,345, 45 pages.
Final Office Action dated Mar. 15, 2013 for U.S. Appl. No. 13/204,535, 18 pages.
Non-Final Office Action dated Mar. 19, 2013 for U.S. Appl. No. 13/284,497, 46 pages.
Non-Final Office Action dated Apr. 19, 2013 for U.S. Appl. No. 13/277,595, 58 pages.
Final Office Action dated Apr. 3, 2014 for U.S. Appl. No. 13/188,295, 37 pages.
Non-Final Office Action dated Apr. 8, 2014 for U.S. Appl. No. 13/175,199, 52 pages.
Non-Final Office Action dated Apr. 23, 2014 for U.S. Appl. No. 13/291,917, 29 pages.
Non-Final Office Action dated Apr. 22, 2014 for U.S. Appl. No. 13/447,069, 51 pages.
Non-Final Office Action dated Sep. 20, 2012 for U.S. Appl. No. 12/870,254, 29 pages.
Non-Final Office Action dated May 14, 2014 for U.S. Appl. No. 13/660,689, 62 pages.
Final Office Action dated May 9, 2014 for U.S. Appl. No. 13/188,136, 43 pages.
Non-Final Office Action dated May 20, 2014 for U.S. Appl. No. 13/551,369 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Non-Final Office Action dated Jun. 18, 2014 for U.S. Appl. No. 13/305,276, 26 pages.
Non-Final Office Action dated Jun. 26, 2014 for U.S. Appl. No. 13/557,425, 24 pages.
Non-Final Office Action dated Jun. 30, 2014 for U.S. Appl. No. 13/305,267, 44 pages.
Notice of Allowance dated Jul. 7, 2014 for U.S. Appl. No. 13/188,295, 51 pages.
Non-Final Office Action dated Jul. 22, 2014 for U.S. Appl. No. 12/958,146, 38 pages.
Notice of Allowance dated Jul. 22, 2014 for U.S. Appl. No. 13/525,065, 82 pages.
Notice of Allowance dated Jul. 22, 2014 for U.S. Appl. No. 13/188,300, 49 Pages.
Non-Final Office Action dated Aug. 8, 2014 for U.S. Appl. No. 13/284,497, 48 pages.
Non-Final Office Action dated Aug. 11, 2014 for U.S. Appl. No. 14/279,176, 22 pages.
Notice of Allowance dated Aug. 21, 2014 for U.S. Appl. No. 13/447,069, 78 pages.
Final Office Action dated Aug. 28, 2014 for U.S. Appl. No. 13/526,988, 83 pages.
Final Office Action dated Sep. 22, 2014 for U.S. Appl. No. 13/175,199, 62 pages.
Non-Final Office Action dated Oct. 17, 2014 for U.S. Appl. No. 13/204,535, 47 pages.
Non-Final Office Action dated Oct. 20, 2014 for U.S. Appl. No. 13/494,959, 64 pages.
Final Office Action dated Oct. 22, 2014 for U.S. Appl. No. 13/557,425, 59 pages.
Final Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Final Office Action dated Dec. 11, 2014 for U.S. Appl. No. 13/447,072, 28 pages.
Non-Final Office Action dated Dec. 1, 2014 for U.S. Appl. No. 13/495,756, 76 pages.
Non-Final Office Action dated Jan. 7, 2015 for U.S. Appl. No. 13/557,425, 30 pages.
Notice of Allowance dated Jan. 21, 2015 for U.S. Appl. No. 13/495,391, 98 pages.
Notice of Allowance dated Feb. 6, 2015 for U.S. Appl. No. 13/204,535, 20 pages.
Non-Final Office Action dated Feb. 13, 2015 for U.S. Appl. No. 14/516,286, 62 pages.
Non-Final Office Action dated Feb. 13, 2015 for U.S. Appl. No. 13/188,136, 44 pages.
Non-Final Office Action dated Apr. 16, 2015 for U.S. Appl. No. 14/521,431, 82 Pages.
Notice of Allowance dated Mar. 19, 2015 for U.S. Appl. No. 13/494,959, 41 Pages.
Notice of Allowance dated Mar. 26, 2015 for U.S. Appl. No. 14/276,688, 90 pages.
Final Office Action dated May 1, 2015 for U.S. Appl. No. 13/557,425, 33 pages.
Non-Final Office Action dated May 14, 2015 for U.S. Appl. No. 14/530,605, 72 pages.
U.S. Appl. No. 15/131,793, filed Apr. 18, 2016.
U.S. Appl. No. 13/557,425, filed Jul. 25, 2012.
Non-Final Office Action dated Jun. 1, 2015 for U.S. Appl. No. 13/447,072, 38 pages.
Final Office Action dated Jun. 2, 2015 for U.S. Appl. No. 14/516,286, 20 pages.
Non-Final Office Action dated May 20, 2015 for U.S. Appl. No. 13/526,988, 52 pages.
Final Office Action dated Jun. 9, 2015 for U.S. Appl. No. 13/495,756, 35 pages.
Notice of Allowance dated Jul. 8, 2015 for U.S. Appl. No. 14/548,901, 146 pages.
Non-Final Office Action dated Sep. 17, 2015 for U.S. Appl. No. 13/495,756, 23 Pages.
Non-Final Office Action dated Sep. 14, 2015 for U.S. Appl. No. 13/557,425, 32 Pages.
Non-Final Office Action dated Sep. 18, 2015 for U.S. Appl. No. 14/641,247, 69 pages.
Notice of Allowance dated Aug. 27, 2015 for U.S. Appl. No. 14/521,431, 39 pages.
Non-Final Office Action dated Nov. 16, 2015 for U.S. Appl. No. 13/188,136, 33 pages.
Non-Final Office Action dated Nov. 23, 2015 for U.S. Appl. No. 14/520,287, 80 pages.
Non-Final Office Action dated Nov. 16, 2015 for U.S. Appl. No. 14/566,657, 87 pages.
Final Office Action dated Nov. 30, 2015 for U.S. Appl. No. 13/447,072, 45 pages.
Non-Final Office Action dated Dec. 18, 2015 for U.S. Appl. No. 14/548,901, 35 pages.
Non-Final Office Action dated Dec. 31, 2015 for U.S. Appl. No. 14/952,609, 32 pages.
Final Office Action dated Dec. 1, 2015 for U.S. Appl. No. 13/526,988, 43 pages.
Non-Final Office Action dated Jan. 11, 2016 for U.S. Appl. No. 13/175,199, 29 pages.
Non-Final Office Action dated Mar. 11, 2016 for U.S. Appl. No. 14/743,076, 86 pages.
Notice of Allowance dated Mar. 16, 2016 for U.S. Appl. No. 14/520,287, 23 pages.
Non-Final Office Action dated Mar. 18, 2016 for U.S. Appl. No. 13/447,072, 37 pages.
Final Office Action dated Apr. 5, 2016 for U.S. Appl. No. 13/188,136, 33 pages.
Non-Final Office Action dated Apr. 13, 2016 for U.S. Appl. No. 14/877,915, 76 pages.
Non-Final Office Action dated May 17, 2016 for U.S. Appl. No. 15/074,622, 18 pages.

(56) References Cited

OTHER PUBLICATIONS

Final Office Action dated Jun. 10, 2016 for U.S. Appl. No. 14/548,901, 33 pages.
Non-Final Office Action dated Jun. 22, 2016 for U.S. Appl. No. 14/970,533, 84 pages.
Non-Final Office Action dated Jun. 28, 2016 for U.S. Appl. No. 15/132,220, 17 pages.
Notice of Allowance dated Jul. 19, 2016 for U.S. Appl. No. 14/952,609, 99 pages.
Non-Final Office Action dated Aug. 24, 2016 for U.S. Appl. No. 14/676,066, 107 pages.
Final Office Action dated Aug. 25, 2016 for U.S. Appl. No. 13/447,072, 38 pages.
Non-Final Office Action dated Sep. 30, 2016 for U.S. Appl. No. 14/957,525, 72 pages.
Notice of Allowance dated Oct. 7, 2016 for U.S. Appl. No. 14/548,901, 45 pages.
Final Office Action dated Oct. 12, 2016 for U.S. Appl. No. 14/877,915, 34 pages.
Notice of Allowance dated Nov. 16, 2016 for U.S. Appl. No. 15/186,410, 80 pages.
Non-Final Office Action dated Dec. 28, 2016 for U.S. Appl. No. 13/447,072, 34 pages.
Non-Final Office Action dated Feb. 14, 2017 for U.S. Appl. No. 14/641,242, 120 pages.
Non-Final Office Action dated Jan. 13, 2017 for U.S. Appl. No. 14/601,800, 95 pages.
Non-Final Office Action dated Jan. 26, 2017 for U.S. Appl. No. 14/877,915, 30 pages.
Non-Final Office Action dated Feb. 15, 2017 for U.S. Appl. No. 15/191,877, 104 pages.
Non-Final Office Action dated Feb. 27, 2017 for U.S. Appl. No. 15/132,220, 91 pages.
Notice of Allowance dated Apr. 10, 2017 for U.S. Appl. No. 14/676,066, 33 pages.
Notice of Allowance dated May 8, 2017 for U.S. Appl. No. 15/466,853, 18 pages.
Notice of Allowance dated May 19, 2017 for U.S. Appl. No. 15/261,841, 83 pages.
Final Office Action dated Jun. 19, 2017 for U.S. Appl. No. 13/447,072, 47 pages.
Final Office Action dated Jun. 12, 2017 for U.S. Appl. No. 15/132,220, 25 pages.
Final Office Action dated Jul. 5, 2017 for U.S. Appl. No. 15/191,877, 32 pages.
Non-Final Office Action dated Jul. 25, 2017 for U.S. Appl. No. 15/422,147, 86 pages.
Non-Final Office Action dated Aug. 24, 2017 for U.S. Appl. No. 14/881,335, 125 pages.
Notice of Allowance dated Aug. 16, 2017 for U.S. Appl. No. 14/877,915, 63 pages.
Non-Final Office Action dated Oct. 4, 2017 for U.S. Appl. No. 15/235,502, 80 pages.
Non-Final Office Action dated Sep. 28, 2017 for U.S. Appl. No. 15/344,468, 107 pages.
Non-Final Office Action dated Sep. 28, 2017 for U.S. Appl. No. 15/132,220, 29 pages.
Non-Final Office Action dated Oct. 18, 2017 for U.S. Appl. No. 15/629,366, 131 pages.
Non-Final Office Action dated Oct. 16, 2017 for U.S. Appl. No. 15/131,793, 84 pages.
Non-Final Office Action dated Nov. 15, 2017 for U.S. Appl. No. 15/191,877, 30 pages.
Final Office Action dated Jan. 8, 2018 for U.S. Appl. No. 15/132,220, 30 pages.
Non-Final Office Action dated Jan. 24, 2018 for U.S. Appl. No. 15/603,416, 99 pages.
Final Office Action dated Feb. 13, 2018 for U.S. Appl. No. 14/881,335, 54 pages.
Final Office Action dated Mar. 30, 2018 for U.S. Appl. No. 15/235,502, 14 pages.
Final Office Action dated Mar. 27, 2018 for U.S. Appl. No. 15/629,366, 23 pages.
Non-Final Office Action dated May 2, 2018 for U.S. Appl. No. 14/704,949, 95 pages.
Non-Final Office Action dated May 11, 2018 for U.S. Appl. No. 15/132,220, 29 pages.
Non-Final Office Action dated May 30, 2018 for U.S. Appl. No. 15/629,366, 30 pages.
Non-Final Office Action dated May 31, 2018 for U.S. Appl. No. 15/603,421, 91 pages.
Non-Final Office Action dated May 29, 2018 for U.S. Appl. No. 14/881,335, 63 pages.
Final Office Action dated Jun. 13, 2018 for U.S. Appl. No. 15/191,877, 33 pages.
Notice of Allowance dated May 21, 2018 for U.S. Appl. No. 15/344,468, 45 pages.
Notice of Allowance dated Aug. 12, 2013 for U.S. Appl. No. 13/174,541, 40 pages.
Final Office Action dated Aug. 2, 2013 for U.S. Appl. No. 13/188,295, 26 pages.
Final Office Action dated Aug. 2, 2013 for U.S. Appl. No. 13/188,300, 38 pages.
Non-Final Office Action dated Jun. 20, 2013 for U.S. Appl. No. 13/219,911, 61 pages.
Non-Final Office Action dated Jul. 17, 2013 for U.S. Appl. No. 13/188,345, 27 pages.
Non-Final Office Action dated Jun. 20, 2013 for U.S. Appl. No. 13/291,917, 52 pages.
Non-Final Office Action dated May 31, 2013 for U.S. Appl. No. 13/523,770, 40 pages.
Non-Final Office Action dated Sep. 19, 2013 for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 85 pages.
Non-Final Office Action dated Nov. 5, 2013 for U.S. Appl. No. 13/188,136, 47 pages.
Final Office Action dated Sep. 18, 2013 for U.S. Appl. No. 13/284,497, 30 pages.
Final Office Action dated Aug. 22, 2013 for U.S. Appl. No. 13/277,595, 36 pages.
Final Office Action dated Oct. 21, 2013 for U.S. Appl. No. 13/523,770, 24 pages.
Final Office Action dated Nov. 5, 2013 for U.S. Appl. No. 13/188,345, 30 pages.
Non-Final Office Action dated Dec. 11, 2013 for U.S. Appl. No. 13/188,295, 52 pages.
Non-Final Office Action dated Dec. 24, 2013 for U.S. Appl. No. 13/188,300, 44 pages.
Final Office Action dated Dec. 11, 2013 for U.S. Appl. No. 13/291,917, 48 pages.
Final Office Action dated Jan. 15, 2014 for U.S. Appl. No. 13/219,911, 38 pages.
Final Office Action dated Jan. 28, 2014 for U.S. Appl. No. 12/958,146, 24 pages.
Notice of Allowance dated Feb. 14, 2014 for U.S. Appl. No. 13/284,456, 47 pages.
Final Office Action dated Feb. 24, 2014 for U.S. Appl. No. 13/927,020, 18 pages.
Non-Final Office Action dated Dec. 30, 2013 for U.S. Appl. No. 13/305,267, 10 pages.
Final Office Action dated May 21, 2013 for U.S. Appl. No. 13/305,276, 28 pages.
Non-Final Office Action dated Oct. 24, 2012 for U.S. Appl. No. 13/305,276, 37 pages.
Final Office Action dated Nov. 25, 2013 for U.S. Appl. No. 13/447,069, 40 pages.
Non-Final Office Action dated May 9, 2013 for U.S. Appl. No. 13/447,069, 33 pages.

(56) References Cited

OTHER PUBLICATIONS

Non-Final Office Action dated Feb. 5, 2014 for U.S. Appl. No. 13/526,988, 56 pages.
Non-Final Office Action dated Mar. 25, 2014 for U.S. Appl. No. 13/488,144, 60 pages.
Interview Summary dated Feb. 3, 2014 for U.S. Appl. No. 13/188,136, 10 pages.
Office Action dated Mar. 6, 2019 for U.S. Appl. No. 15/996,203, 117 pages.
Office Action dated Mar. 20, 2019 for U.S. Appl. No. 15/629,366, 26 pages.
Notice of Allowance for U.S. Appl. No. 14/881,335 dated May 30, 2019, 99 pages.
Notice of Allowance for U.S. Appl. No. 15/629,366 dated Jul. 1, 2019, 25 pages.

* cited by examiner

ASSIGNMENT OF HIERARCHICAL CELL STRUCTURES EMPLOYING GEOLOCATION TECHNIQUES

CROSS REFERENCE TO RELATED APPLICATIONS

This application is a continuation of, and claims priority to each of, U.S. patent application Ser. No. 15/131,793 (now U.S. Pat. No. 10,039,111), filed on Apr. 18, 2016, entitled "ASSIGNMENT OF HIERARCHICAL CELL STRUCTURES EMPLOYING GEOLOCATION TECHNIQUES," which is a continuation of U.S. patent application Ser. No. 13/557,425 (now U.S. Pat. No. 9,351,223), filed on Jul. 25, 2012, entitled "ASSIGNMENT OF HIERARCHICAL CELL STRUCTURES EMPLOYING GEOLOCATION TECHNIQUES." The entireties of the foregoing listed applications are hereby incorporated by reference herein.

TECHNICAL FIELD

The subject disclosure relates to wireless communications and, more particularly, to various embodiments that facilitate assignment of hierarchical cell structures employing geolocation techniques.

BACKGROUND

In wireless mobility engineering, the term near-far generally refers to a condition in which mobile devices very close to a radio transceiver base station (BS) present noise levels that mask other signals that the radio transceiver BS may need to acquire. One may incorrectly assume that signals from mobile devices on different frequencies are isolated from one another and therefore do not interfere with one another. However, both mobile device and BS radio transmissions can occupy a power mask that specifies filter characteristics of the transmitted signals. These specifications can allow a small portion of transmitted power to leak into adjacent frequencies. When both mobile devices are at roughly the same distance from the radio BS, this leakage is insignificant and may not impair signal receiving. However, as one mobile device moves farther away from the radio BS, the signal strength of the signal from the mobile device can drop. As such, the ratio of the signal power from the mobile device to the power leakage from an adjacent frequency can be reduced. As the mobile device on the adjacent frequency moves closer to the radio BS, the ratio can be further reduced. Eventually, the ratio can be reduced to the extent that the receipt of a signal from a mobile device further from the radio BS can be impaired.

Generally, as mobile devices approach a radio BS, the transmissions of the mobile devices are powered down, thereby reducing the near-far effect. As such, when more than one mobile device is served by the same radio BS, the near-far effect is minimal and not considered a primary driver of call performance. However, when a mobile device that is near a particular radio BS is served by a distance radio BS, the mobile device may not be powered down. This is the condition that can present the "performance-affecting" near-far effect.

This performance-affecting near-far effect can exist when a mobile device using another telecommunication company service is being served by a radio BS that may be miles away, causing the mobile device to transmit at high power right next to a nearby radio BS associated with another telecommunications company service.

This performance-affecting near-far effect can also exist when different mobile radio network access technologies (e.g., Global System for Mobile Communications (GSM), Universal Mobile Telecommunications System (UMTS)) are used in the same network, but are not equipped on all BSs within that network. For example, a mobile device may be using UMTS radio access technology and may move into close proximity of a BS not equipped with UMTS radio access technology. Since the mobile device cannot make a handoff to a UMTS radio on that BS, the mobile device will transmit at a power level much higher than would be the case if the BS was equipped with a UMTS radio. This configuration often occurs during network-wide roll-out of a new radio access technology and there is a temporal factor in all radio BSs being equipped with the new technology. During the intervening period, the sparseness of radio deployments on the new technology are generally referred to as a Swiss cheese network where the holes imply BSs not having the new access technology radios.

DETAILED DESCRIPTION

Figure 1:
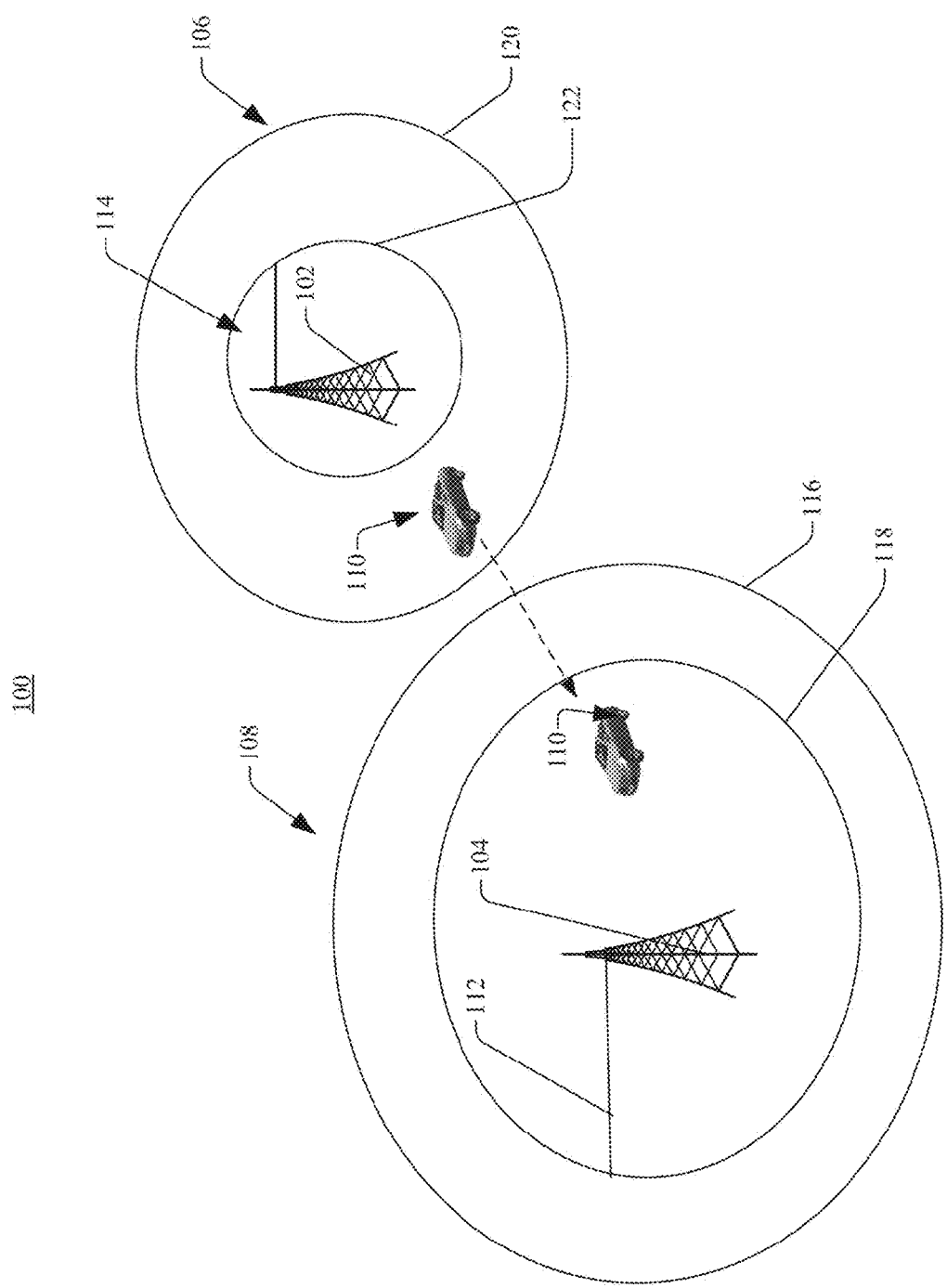
FIG. 1 illustrates an example system in which assignment of hierarchical cell structures employing geolocation techniques can be facilitated in accordance with embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard). Moreover, the following descriptions of the various embodiments are intended to neither identify key or critical elements of any of the embodiments nor delineate any scope particular to such embodiments, or any scope of the claims.

As used in this application, the terms "component," "module," "system," "interface," "platform," "service," "framework," "connector," "controller" or the like are generally intended to refer to a computer-related entity, either hardware, a combination of hardware and software, software or software in execution or an entity related to an operational machine with one or more specific functionalities. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application, and/or application programming interface (API) components.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "BS (or BSs)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

Embodiments described herein can be exploited in substantially any wireless communication technology, including, but not limited to, Wireless Fidelity (Wi-Fi), GSM, UMTS, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femtocell" are used interchangeably, and the terms "macro" and "macrocell" are used interchangeably.

The following description and the annexed drawings set forth certain illustrative embodiments of the embodiments. These embodiments are indicative, however, of but a few of the various ways in which the principles of the embodiments can be employed. Other features of the embodiments will become apparent from the following detailed description of the embodiments when considered in conjunction with the drawings.

In one or more embodiments, a method can include: receiving, by a system including a processor, measurement information relating to a mobile device, wherein the measurement information includes first information indicative of a geographical location of the mobile device; determining, by the system, second information indicative of a geographical location of a cell site to which the mobile device is assigned; and selecting, by the system, a sector of the cell site with which to associate the mobile device, wherein the selecting is based, at least, on a distance determined between the mobile device and the cell site.

In one or more embodiments, a non-transitory computer-readable storage medium can store computer-executable instructions that, in response to execution, cause a system including a processor to perform operations. The operations can include: receiving a request for a handoff for a mobile device; and determining a sector of a cell site associated with the system to which to assign the mobile device in connection with the handoff, wherein the determining is based, at least, on a distance that is determined between the mobile device and the cell site.

In one or more embodiments, a system can include a memory that stores computer-executable instructions, and a processor, communicatively coupled to the memory, that facilitates execution of computer-executable instructions to: determine a distance between a mobile device and a cell site; and determine one of a plurality of sectors of the cell site to assign the mobile device based, at least, on the distance.

A hierarchical cell structure (HCS) is a type of cell structure that allows the network to use the geographical area and serve an increasing population. In some embodiments, the HCS can include a cell site associated with a BS, and one or more sectors associated with the cell site. Each sector can operate on a different frequency.

Currently, the technique employed for HCS assignment applies assignment of HCSs based on power load and utilization of sectors to select a low capacity sector to perform handoffs and cell re-selection. In the embodiments described herein, selection and/or re-selection of sectors is performed. The selection and/or re-selection is based, at least, on the distance between the mobile device and the cell site.

In various embodiments, the mobile devices in a network can receive and transmit signals to a cell site. As the mobile device moves from one location to another, the signal reception can be handed over to a cell site that is near to the mobile device in order to maintain signal strength and, correspondingly, good reception. In the embodiments described herein, sector selection and/or re-selection can be based on the distance between the mobile device and the cell site, as opposed to being based on the power of the received signal.

Attributes such as latitude and longitude of the mobile device, and the current cell site associated with a mobile device can be obtained from a central geolocation engine. For example, the latitude and longitude of the current cell site can be obtained from an internal database that stores locations of all cell sites and/or locations of mobile devices.

Distance calculations can be performed before the selection of the sector, and, based, at least, on the distance between the mobile device and the cell site, the system can assign to the mobile device a sector, or layer, of the cell site.

If the distance between the mobile device and the cell site is less than a threshold value (which can be predefined based, at least, on the morphology of the terrain for the area in which the mobile device is traveling), the mobile device is assigned to a first sector. The mobile device can be assigned to a second sector if the distance is greater than the threshold value. Rural areas can have higher threshold values than urban areas.

In some embodiments, a rural area can be an area that has less than a predefined number of buildings and/or more than a predefined amount of cropland, water or marshland. In some embodiments, a rural area can be defined by an area having less than a predefined population density (e.g., less than 1,000 persons per square mile) or a predefined population (e.g., less than 2,500 persons).

In some embodiments, an urban area can be an area that has more than a predefined number of buildings and/or less than a predefined amount of cropland, water or marshland. In some embodiments, an urban area can be defined by an area having more than a predefined population density (e.g., greater than or equal to 1,000 persons per square mile) or a predefined population (e.g., greater than 50,000 persons).

In some embodiments, a predefined list can exist that correlates particular areas with the designation of either a rural area or an urban area.

In some embodiments, the morphology can be dictated by one or more critical points of a terrain and critical lines joining the critical points. In some embodiments, the morphology of a terrain can be dictated by one or more of the values of the following parameters in an area: building density, building height, roof reflectivity (e.g., bright or dark), impervious surface reflectivity, bare ground, cropland, grassland, marshland, water, number and height of coniferous trees, number and height of evergreen trees, number and height of deciduous trees, number and height of shrubs. If a certain number of particular features exist (or exist at an average height), the morphology of the terrain can be urban (or rural, depending on the features).

The first sector can be a near sector and the second sector can be a far sector. For example, if a distance is less than a threshold, a near sector can be assigned. The near sector (e.g., sector 1 of a three sector cell) can be a sector that operates on higher frequencies (e.g., 1900 Megahertz (MHz)) in some embodiments. The far sector (e.g., sector 2) can be a sector that operates on lower frequencies (e.g., 850 MHz).

One or more of the embodiments can employ innovating HCS-based techniques for sector selection and re-selection based, at least, on the distance between the cell site and the mobile device to address the near-far problem. By employing the systems and methods described herein for selection and/or handoffs, call quality can be increased, noise can be reduced and/or call drops can be mitigated. Various embodiments can advantageously facilitate balancing of traffic load, avoidance or reduction of congestion and general improvement in network performance.

FIG. 1 illustrates an example system in which assignment of HCSs employing geolocation techniques can be facilitated in accordance with embodiments described herein. In these embodiments, the HCSs can be the sectors of the cell sites.

Referring to FIG. 1, the system 100 can include a mobile device 110 configured to transmit signals to BSs 102, 104. The BSs 102, 104 can cover the geographical regions corresponding to cell sites 106, 108, respectively.

BS can be split into different sectors in some embodiments. Each sector can have a corresponding frequency on which communication occurs. For example, sector one can correspond to 850 MHz and sector two can correspond to 1900 MHz. In various embodiments, the mobile devices can be assigned to different sectors of the cell site. In various embodiments, the mobile devices can be switched between the different sectors upon re-selection of sectors.

As shown in FIG. 1, a first cell site 106 can correspond to the geographical region covered by BS 102, and a second cell site 108 can correspond to the geographical region covered by BS 104. Each of cell site 106, 108 can be divided into multiple sectors. For example, cell site 106 can be divided into a near sector 122 (e.g., a sector near the BS 102) and a far sector 120. Cell site 108 can be divided into near sector 118 and far sector 116. For each sector, Each sector can have an associated frequency over which communication between a BS and the mobile device 110 can occur. For example, in some embodiments, one of the sectors 116, 118 of cell site 108 can be associated with a frequency of 1900 MHz over which communication with the BS 104 occurs, and another one of the sectors 116, 118 can be associated with a frequency of 850 MHz over which communication with the BS 104 occurs. As such, the mobile device 110 can communicate over the frequency associated with either of the sectors 116, 118. In various embodiments, the mobile device 110 communicates over the sector to which the mobile device 110 is assigned.

In some embodiments, the system 100 can facilitate assignment of a sector of a cell site associated with BSs 102, 104 to the mobile device 110. For example, the sector can be assigned to the mobile device 110 upon handoff of the mobile device 110 from one cell site to another cell site. The system 100 can facilitate assignment of the sector based, at least, on the distance between the mobile device and the BS. For example, if the distance between the mobile device 110 and the BS 104 is less than distance 112, the mobile device 110 can be assigned to a first sector 118. If the distance is greater than distance 112, the mobile device 110 can be assigned to a second sector 116.

In one embodiment, the sector to which the mobile device 110 is assigned can be determined by the BS covering the geographical region of the cell site to which the sectors are associated. The BS can communicate information to the mobile device 110 for communicating on such sector frequency.

In another embodiment, the sector to which the mobile device 110 is assigned can be determined by a system distinct from the BS covering the geographical region of the cell site to which the sectors are associated. For example, in some embodiments, a central system (not shown) can receive information from BS 104 informing the central system that the mobile device 110 requires handoff to BS 104 from BS 102. The central system can determine a sector to which to assign the mobile device 110 based on the information provided by the BS 104.

Accordingly, upon handoff from BS 102 to BS 104, a sector of the cell 108 is selected for mobile device 110 communication with the BS 104. Systems and methods for selection of the sector can be as described in further detail herein and also with reference to FIGS. 2-10.

Figure 2:
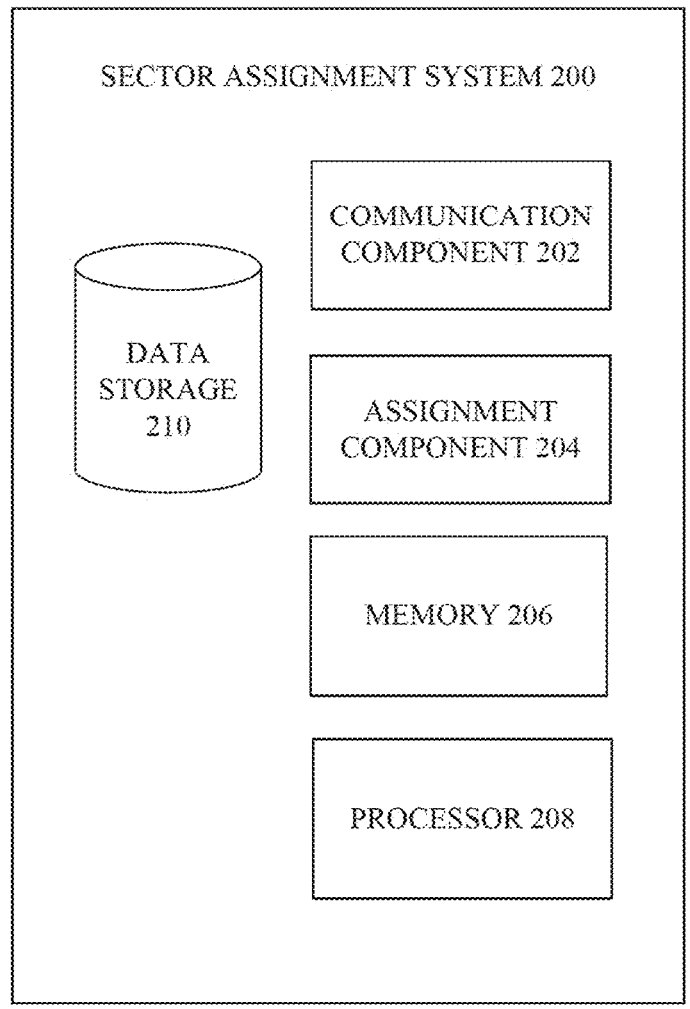
FIG. 2 illustrates an example system that facilitates assignment of hierarchical cell structures employing geolocation techniques in accordance with embodiments described herein.

Turning now to FIG. 2, the sector assignment system 200 is shown and can include a communication component 202, assignment component 204, memory 206, processor 208 and/or data storage 210. In various embodiments, the communication component 202, assignment component 204, memory 206, processor 208 and/or data storage 210 can be electrically and/or communicatively coupled to one another to perform one or more functions of the sector assignment system 200.

The communication component 202 can transmit and/or receive information to and/or from one or more mobile devices, one or more other BSs and/or to or from a central system as described with reference to FIG. 1. In some embodiments, the communication component 202 can obtain or determine measurement information associated with a mobile device. For example, the measurement information can include, but is not limited to, a geographical location at which the mobile device is located at the time that the measurement information is obtained.

In various embodiments, the measurement information can include latitude and longitude information indicating the geographical location of the mobile device, a city or street address at which the mobile device is located and/or any other of a number of different indicia of geographical location.

In some embodiments, wherein the sector assignment system 200 is located at a BS, the sector assignment system 200 can obtain the measurement information from a central system remote from the BS. The central system can collect measurement information for a number of different mobile devices, for example, and provide such information to the BS upon request.

In some embodiments, the BS can store previously-obtained measurement information in data storage (e.g., data storage 210) at the BS and need not request measurement information from the central system. For example, in some embodiments, the communication component 202 can detect signals transmitted from the mobile device and can retrieve the measurement information from such signals detected by the BS.

In various embodiments, the BS can obtain the measurement information upon determining that the mobile device (e.g., mobile device 110) requires handoff to the BS or at any time other than those associated with handoff. For example, in various embodiments, the BS can obtain measurement information for a mobile device while a call is in progress at the mobile device or while no call is in progress at the mobile device.

In some embodiments, wherein the sector assignment system 200 is located at a central system distinct from the BS, the sector assignment system 200 can access measurement information for the mobile device stored at the central system at any time and/or upon receiving information or a request to transmit the measurement information to a BS.

The sector assignment system 200 can also include an assignment component 204. The assignment component 204 can determine a sector of a cell site to which to assign a mobile device. The structure and/or functionality the assignment component 204 can be as described in greater detail with reference to FIG. 3 (or vice versa).

Figure 3:
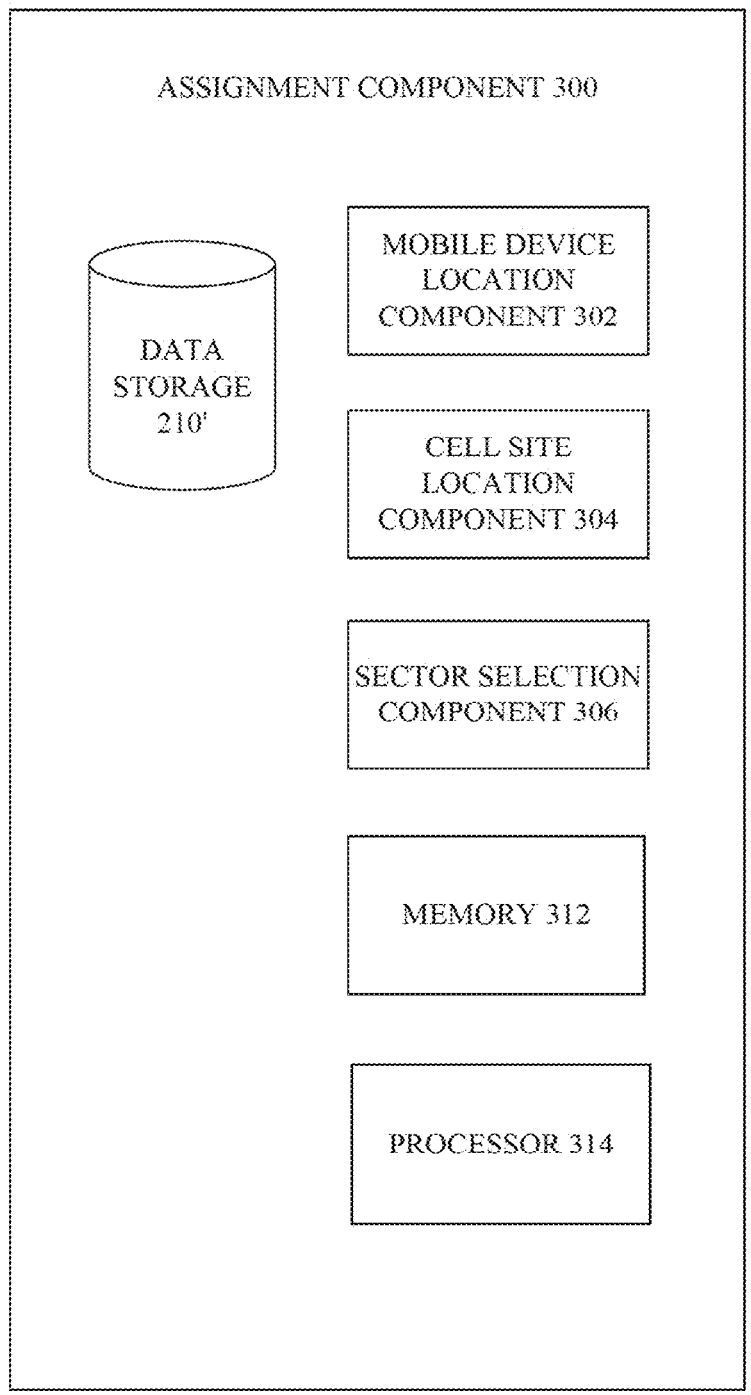
FIG. 3 illustrates an example system that facilitates assignment of hierarchical cell structures employing geolocation techniques in accordance with embodiments described herein.

Turning now to FIG. 3, the assignment component 300 can include a mobile device location component 302, a cell site location component 304, a sector selection component 306, a memory 308, a processor 310 and/or a data storage 210'. In various embodiments, one or more of the mobile device location component 302, cell site location component 304, sector selection component 306, memory 308, processor 310 and/or data storage 210' can be electrically and/or communicatively coupled to one another to perform one or more of the functions of the assignment component 300.

The mobile device location component 302 can access and/or retrieve measurement information about a mobile device within geographical proximity to the cell site of interest. For example, in some embodiments, when handoff is scheduled to take place from a first BS to a second BS, the mobile device location component can access and/or retrieve measurement information about the geographical location of the mobile device.

The mobile device location component 302 can access and/or retrieve the measurement information from a central system remote from the assignment component 300 in some embodiments. In some embodiments, the mobile device location component 302 can access and/or retrieve the measurement information from the mobile device and/or from the data storage 210'.

In various embodiments, the geographical location information accessed and/or retrieved by the mobile device location component 302 can include latitude and/or longitude of the geographical location of the mobile device and/or a city or street address corresponding to the geographical location of the mobile device.

The cell site location component 304 can access and/or retrieve information indicative of one or more cell sites. For example, the information can include a latitude and longitude of the one or more cell sites. In embodiments, wherein the assignment component 300 is located at the BS, the cell site location component 304 can access and/or retrieve information indicative of a location of the BS. In various embodiments, the cell site location can be the location of the BS for the cell site.

The cell site location component 304 can access and/or retrieve the measurement information from a central system remote from the assignment component 300 in some embodiments. In some embodiments, the cell site location component 304 can access and/or retrieve the measurement information from the data storage 210'.

The sector selection component 306 can determine a sector of the cell site to which to assign the mobile device. In various embodiments, the sector selection component 306 can determine the sector during handoff of the mobile device, during a time that the mobile device is on a call, during a time that the mobile device is not on a call or in any number of different instances as long as measurement information for the mobile device and geographical location information for the cell site are known.

The sector selection component 306 can assign the sector based, at least, on the distance between the mobile device and the cell site.

In some embodiments, the sector selection component 306 can access the measurement information for the mobile device from the mobile device location component 302, and access the geographical location of the cell site from the cell site location component 304. The sector selection component 306 can calculate the distance between the mobile device and the cell site.

In some embodiments, the sector selection component 306 can determine whether the distance between the mobile device and the cell site is less than a threshold value. If the distance is less than the threshold value, the sector selection component 306 can assign the mobile device to a first sector of the cell site. If the distance is greater than or equal to the threshold value, the sector selection component 306 can assign the mobile device to a second sector of the cell site.

In various embodiments, the first sector can be a sector nearer to the BS of the cell than the second sector. For example, referring back to FIG. 1, the first sector can be the sector 118 for cell site 108 and the second sector can be the sector 116 for the cell site 108. As such, if the distance between the mobile device (e.g., mobile device 110) and the cell site (e.g., cell site 108) is less than the threshold value (e.g., distance 112), the sector selection component 306 can assign the mobile device (e.g., mobile device 110) to sector 118. If the distance is greater than or equal to the threshold value (e.g., distance 112), the sector selection component 306 can assign the mobile device (e.g., mobile device 110) to sector 116.

In various embodiments, the sector nearer the BS can be associated with a higher frequency (e.g., 1900 MHz) than the sector farther away from the BS.

In some embodiments, the sector selection component 306 can determine the threshold value based on the distance between the mobile device and the cell site as a function of the morphology of the area in which the mobile device is located. For example, if the mobile device is located in a rural area, the threshold value can be greater than if the mobile device is located in an urban area. As such, the sector selection component 306 can change the threshold value that determines the sector to which to assign the mobile device, based on the morphology of the area in which the mobile device is located.

Turning back to FIG. 2, the memory 206 can be a computer-readable storage medium storing computer-executable instructions and/or information for performing the functions described herein with reference to the sector assignment system 200. Processor 208 can perform one or more of the functions described herein with reference to the sector assignment system 200.

The data storage 210 can be configured to store information transmitted to, received by and/or processed by the sector assignment system 200. For example, with reference to FIG. 4, the data storage 210, 210', 210" can store measurement information 402 for one or more mobile devices, cell site location information 404, sector information 406, distance-morphology information 408 or the like.

As described above, the measurement information 402 can include geographical location information indicative of the location at which a mobile device is currently located or at which the mobile device was located at a time that the measurement information was obtained for the mobile device.

The cell site location information 404 can include indicative of a geographical location of a cell site, an associated BS, one or more mobile devices currently assigned to the cell site or the like.

The sector information 406 can include a sector number, a corresponding frequency for the sector and/or a number or identity of mobile devices assigned to the sector. For example, in some embodiments, the sector information 406 can include an identifier of a first sector and an associated frequency of 1900 MHz. As another example, the sector information 406 can include an identifier of a second sector and an associated frequency of 850 MHz.

The distance-morphology information 408 can include morphology information for different types of geographical regions and corresponding threshold values for determining the sector to which to assign the mobile device. For example, for a mobile device in a geographical region with a rural morphology, the threshold value between a mobile device and a cell site can be a first value while the threshold value can be a second value for a mobile device in a region with an urban morphology. The value associated with the rural morphology can be greater than the value associated with the urban morphology.

The threshold values can also correspond to particular sectors. As such, for each morphology, a threshold value of distance between the mobile device and the cell site can be stored. Further, one or more sectors can be associated with the distance. For example, for cases in which the distance between the mobile device and the cell site is less than the threshold value of distance, a first sector can be stored. For cases in which the distance between the mobile device and the cell site is greater than the threshold value of distance, a second sector can be stored.

Accordingly, the data storage 210, 210', 210" can be accessed to determine a sector to which to assign a mobile device and/or sector frequency information in various embodiments.

Figure 4:
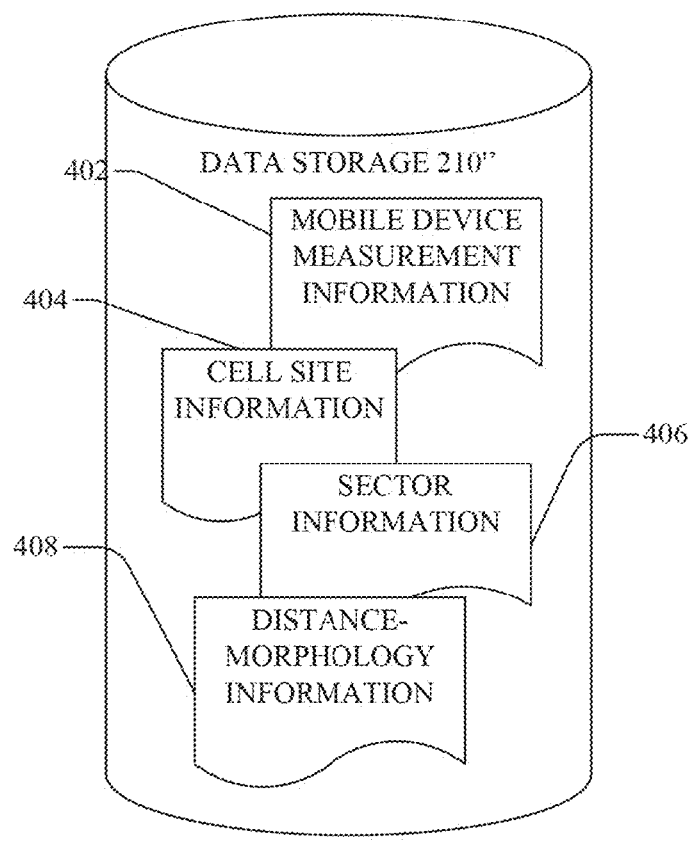
FIG. 4 illustrates an example data storage that facilitates processing for assignment of hierarchical cell structures employing geolocation techniques in accordance with embodiments described herein.

With reference to FIGS. 2, 3 and 4, in various embodiments, only one of the memory 206, 312, only one of the processor 208, 314 and/or one or more of the data storage 210, 210', 210" can be employed to perform the functions described herein. Duplicative components need not be employed in various embodiments.

FIGS. 5-9 illustrate example flowcharts of methods that facilitate processing for assignment of hierarchical cell structures employing geolocation techniques in accordance with embodiments described herein.

Figure 5:
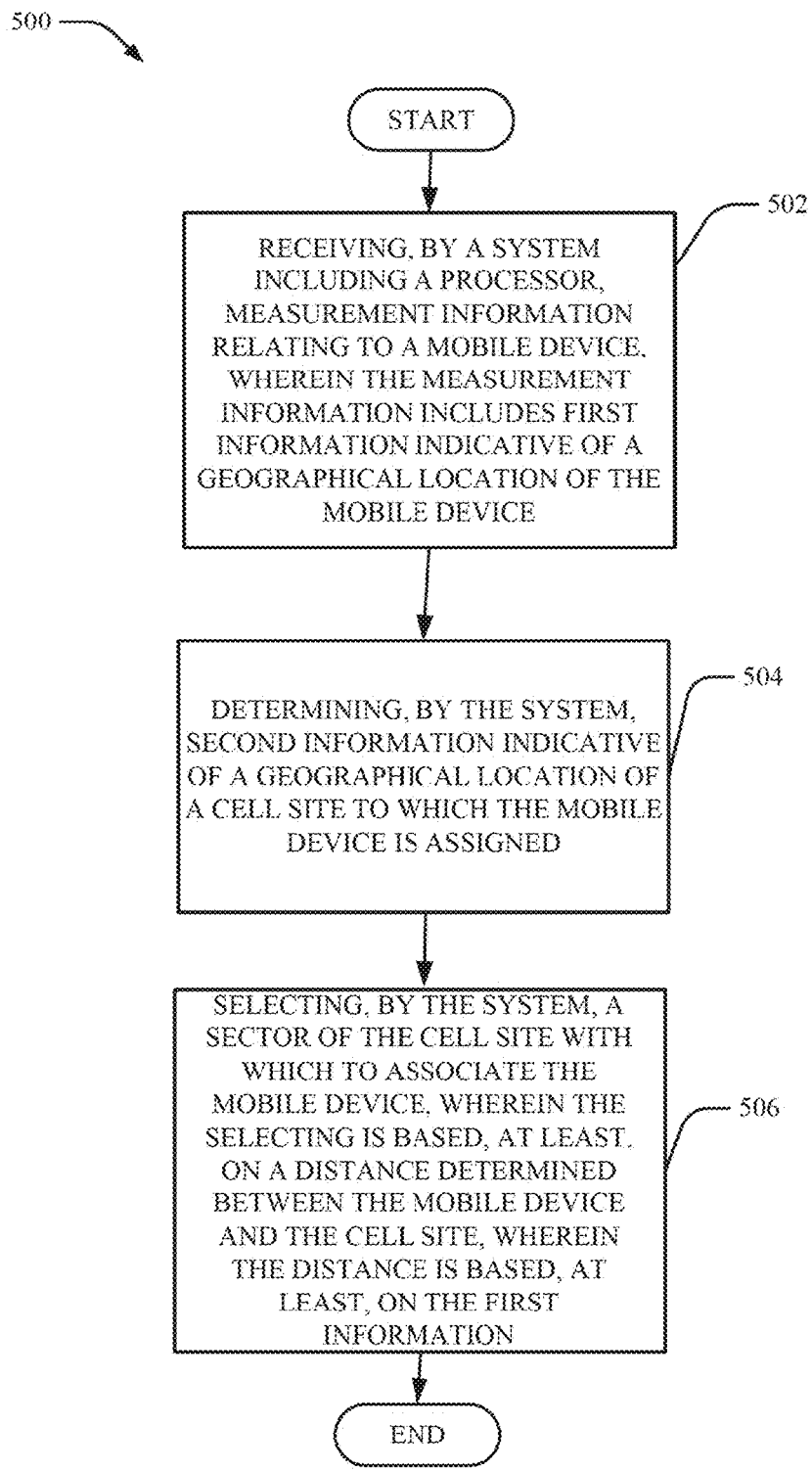
FIGS. 5-9 illustrate example flowcharts of methods that facilitate processing for assignment of hierarchical cell structures employing geolocation techniques in accordance with embodiments described herein.

Turning first to FIG. 5, at 502, method 500 can include receiving, by a system including a processor, measurement information relating to a mobile device. The measurement information can include information indicative of a geographical location of the mobile device. In some embodiments, the information indicative of the geographical location includes latitude and a longitude of the geographical location of the mobile device.

At 504, method 500 can include determining, by the system, information indicative of a geographical location of a cell site to which the mobile device is assigned. In various embodiments, the cell site to which the mobile device is assigned can be associated with the BS to which the mobile device will be transferred upon handoff.

At 506, method 500 can include selecting a sector of the cell site with which to associate the mobile device. In some embodiments, selecting is based, at least, on a determined distance between the mobile device and the cell site. The distance is based, at least, on the first information received at 502. In some embodiments, the mobile device is assigned to a first sector if the distance between the mobile device and the cell site is less than a predefined value. In some embodiments, the mobile device is assigned to a second sector if the distance between the mobile device and the cell site is greater than or equal to a predefined value.

In some embodiments, the manner of assigning the sector can be as described with reference to FIG. 6.

Figure 6:
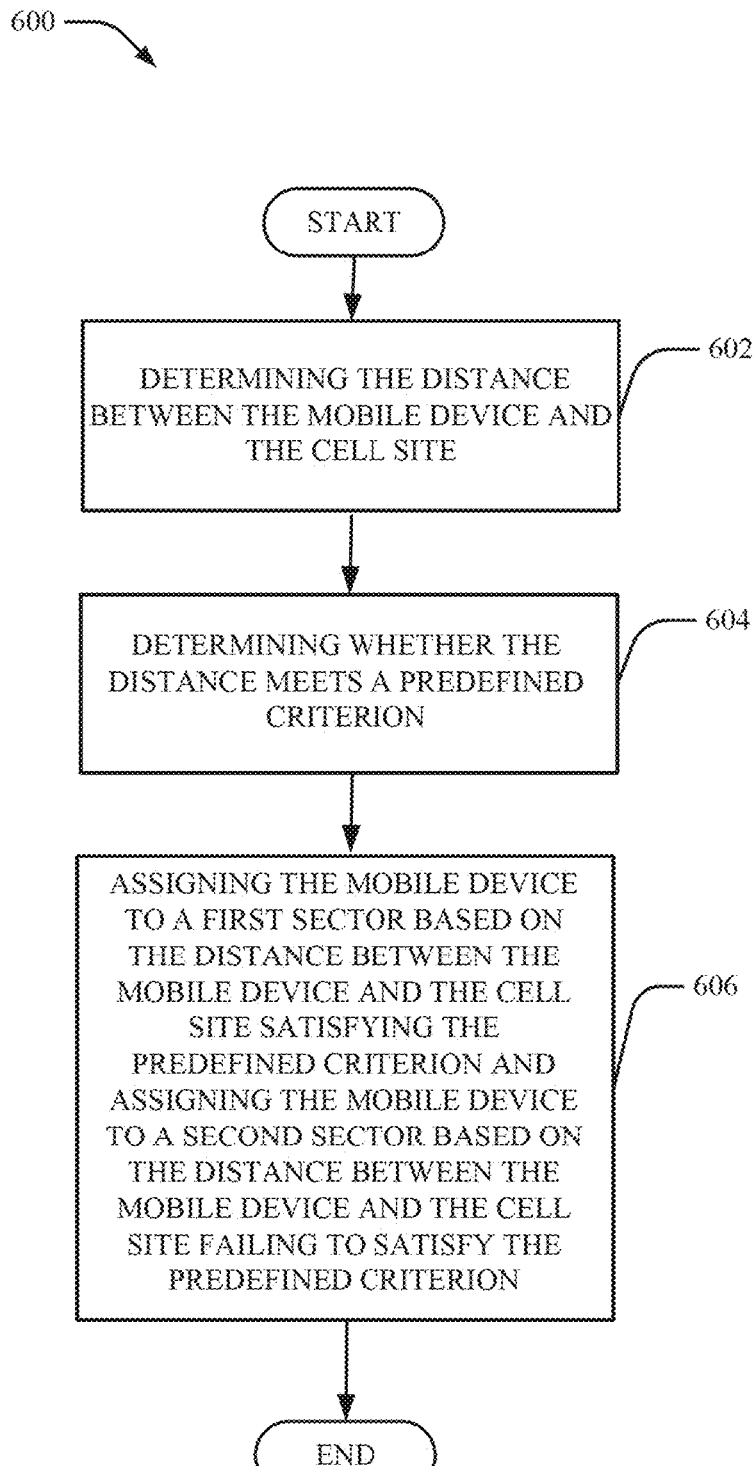

Turning to FIG. 6, at 602, method 600 can include determining the distance between the mobile device and the cell site.

At 604, method 600 can include determining whether the distance meets a predefined criterion. In some embodiments, the predefined criterion can be whether the mobile device is less than a particular distance from the cell site.

At 606, method 600 can include assigning the mobile device to a first sector based on the distance between the mobile device and the cell site satisfying the predefined criterion, and assigning the mobile device to a second sector based on the distance between the mobile device and the cell site failing to satisfy the predefined criterion.

Figure 7:
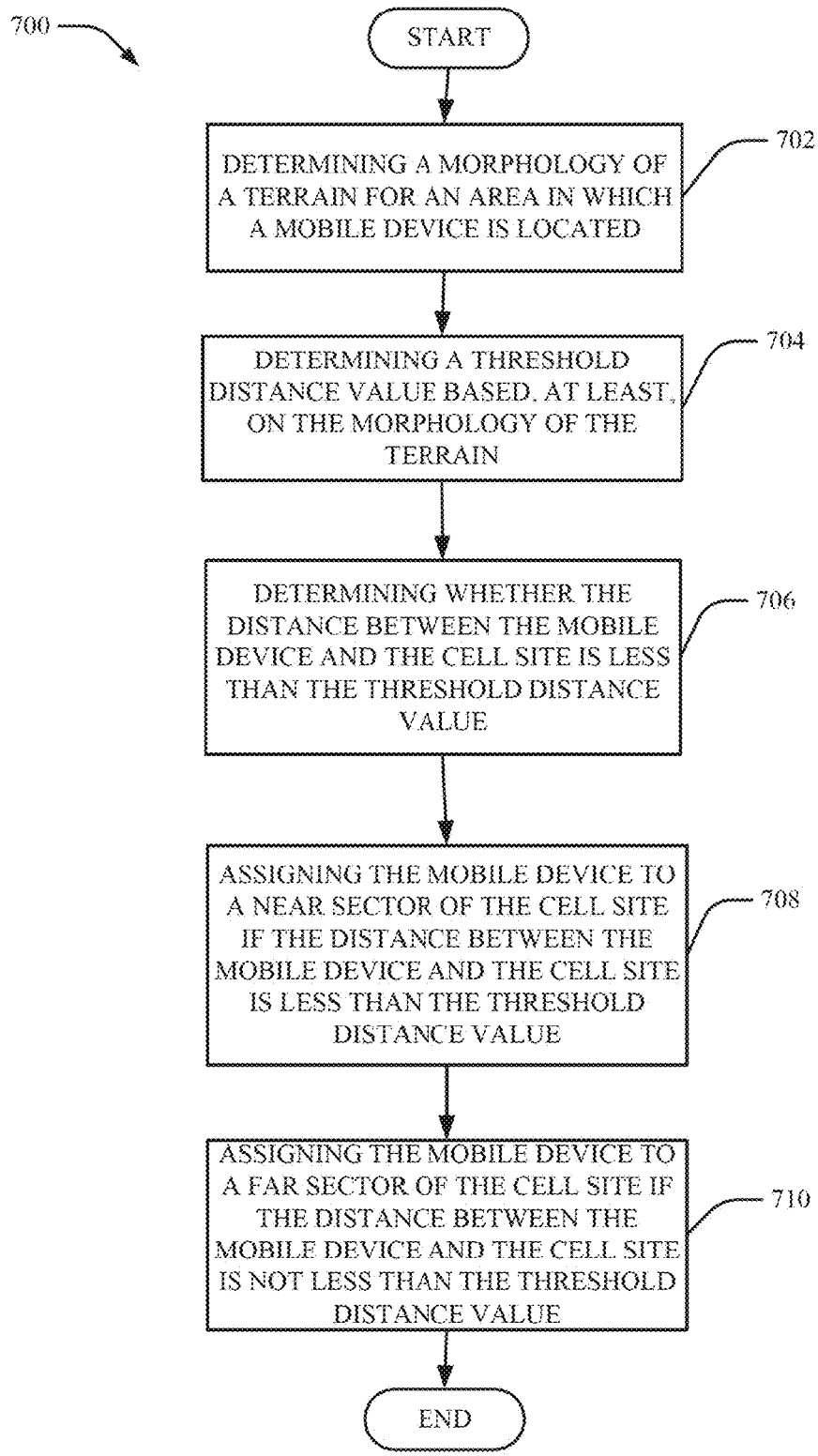

Another method for assigning a sector can be as described with reference to FIG. 7. At 702, method 700 can include determining the morphology of a terrain for an area in which a mobile device is located. In various embodiments, the morphology of the terrain can be associated with a rural area or an urban area.

At 704, method 700 can include determining a threshold distance value based, at least, on the morphology. For example, the threshold distance value can be a first value if the morphology of the terrain is associated with a rural area, and a second, lesser value, if the morphology of the terrain is associated with an urban area.

At 706, method 700 can include determining whether the distance between the mobile device and the cell site is less than the threshold distance value.

At 708, method 700 can include assigning the mobile device to a near sector of the cell site if the distance between the mobile device and the cell site is less than the threshold distance value. In various embodiments, the near sector can be associated with a higher frequency than the far sector. For example, the near sector can be associated with a frequency of 1900 MHz.

At 710, method 700 can include assigning the mobile device to a far sector of the cell site if the distance between the mobile device and the cell site is not less than the threshold distance value. In various embodiments, the far sector can be associated with a lower frequency than the near sector. For example, the far sector can be associated with a frequency of 850 MHz.

Figure 8:
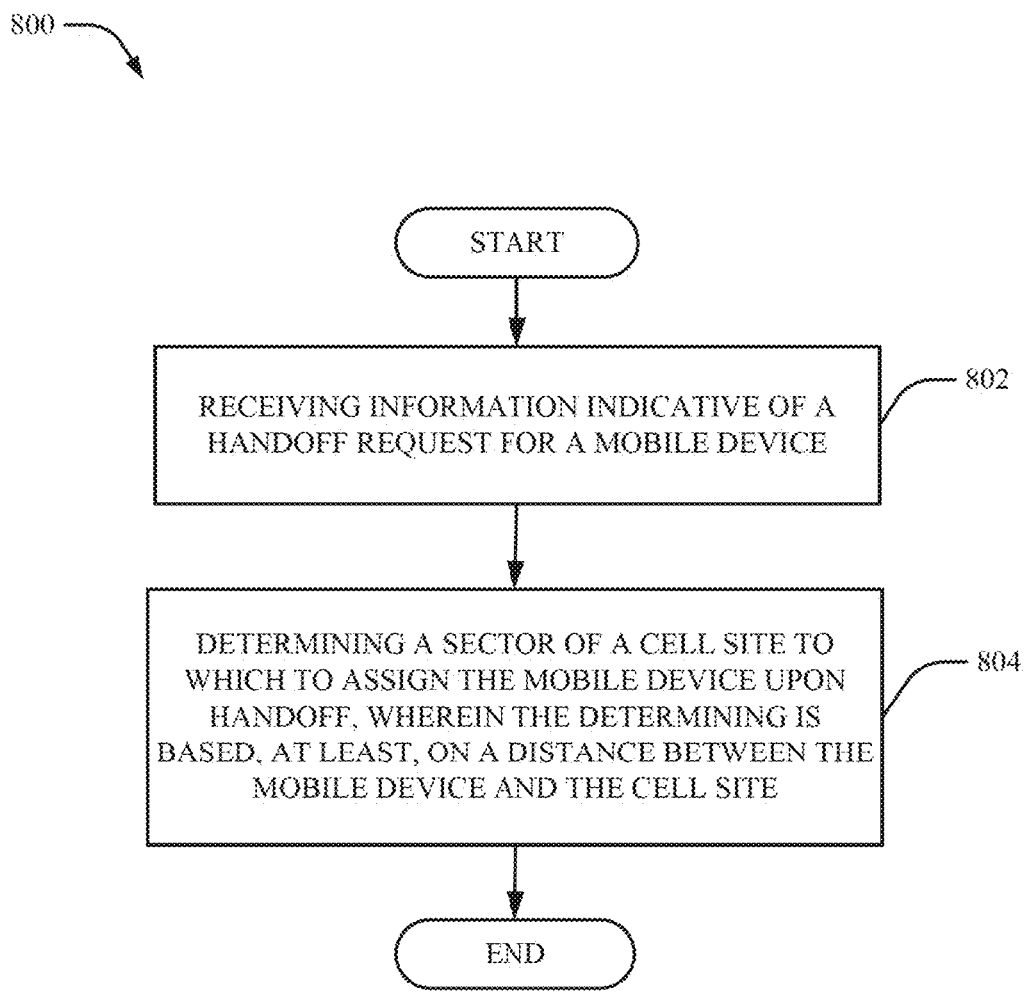

Turning now to FIG. 8, at 802, method 800 can include receiving information indicative of a handoff request for a mobile device. At 804, method 800 can include determining a sector of a cell site to which to assign the mobile device upon handoff. In some embodiments, the determination is made based, at least, on the distance between the mobile device and the cell site.

Figure 9:
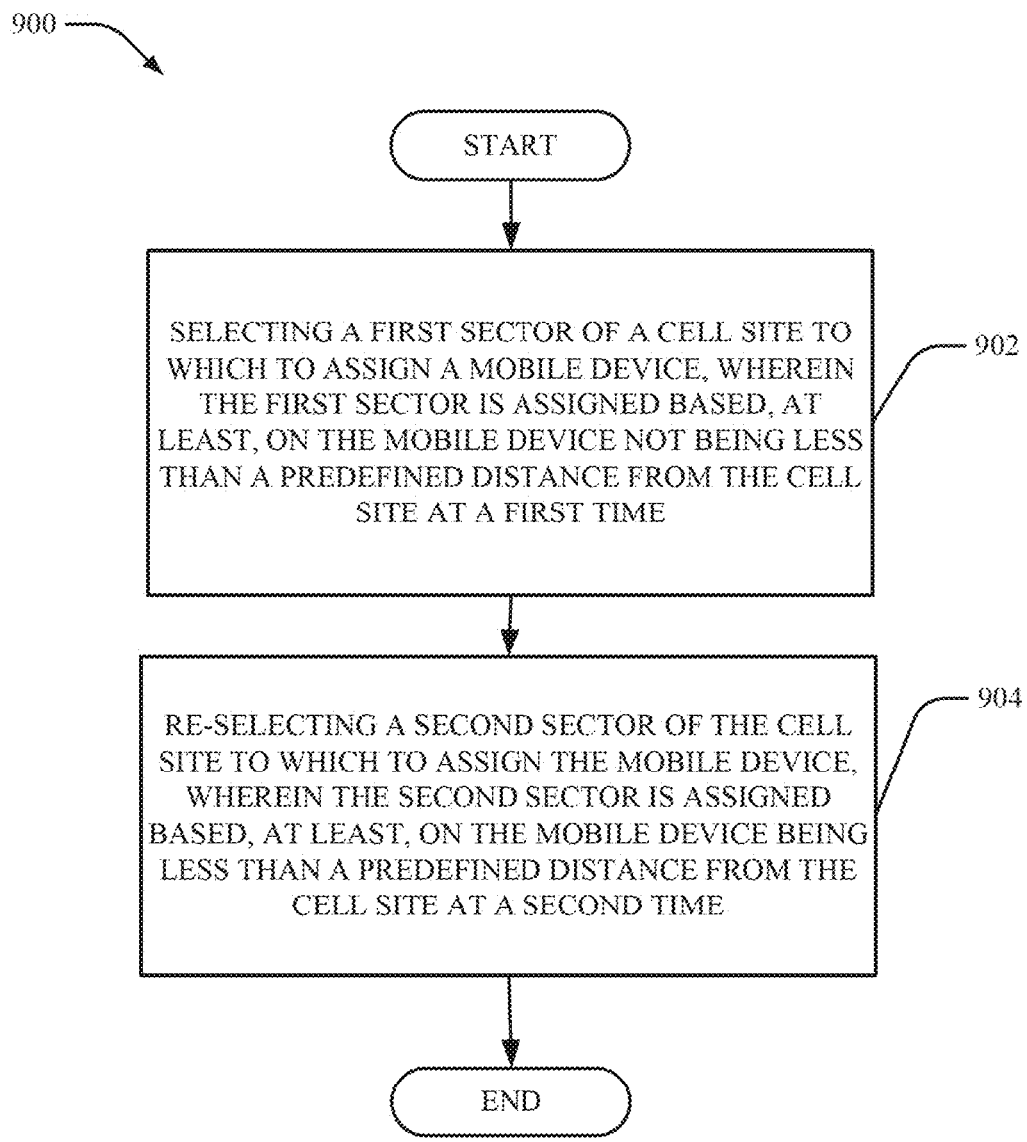

Turning now to FIG. 9, at 902, method 900 can include selecting a sector of a cell site to which to assign a mobile device. In various embodiments, the selection can be based, at least, on a distance between the mobile device and the cell site at a first time.

At 904, method 900 can include re-selecting a sector of the cell site to which to assign the mobile device. In various embodiments, the re-selection can be based, at least, on the distance between the mobile device and the cell site at a second time.

For example, at a first time, the distance between the mobile device and the cell site may be a first value that is greater than a threshold distance value, thereby resulting in an assignment of the mobile device to a far sector of the cell site. At a second time, after further travel towards the cell site, the distance between the mobile device and the cell site may be a second value (that is less than the first value). The second value may be less than a threshold distance value. As such, the mobile device can be re-assigned to the near sector of the cell site.

Figure 10:
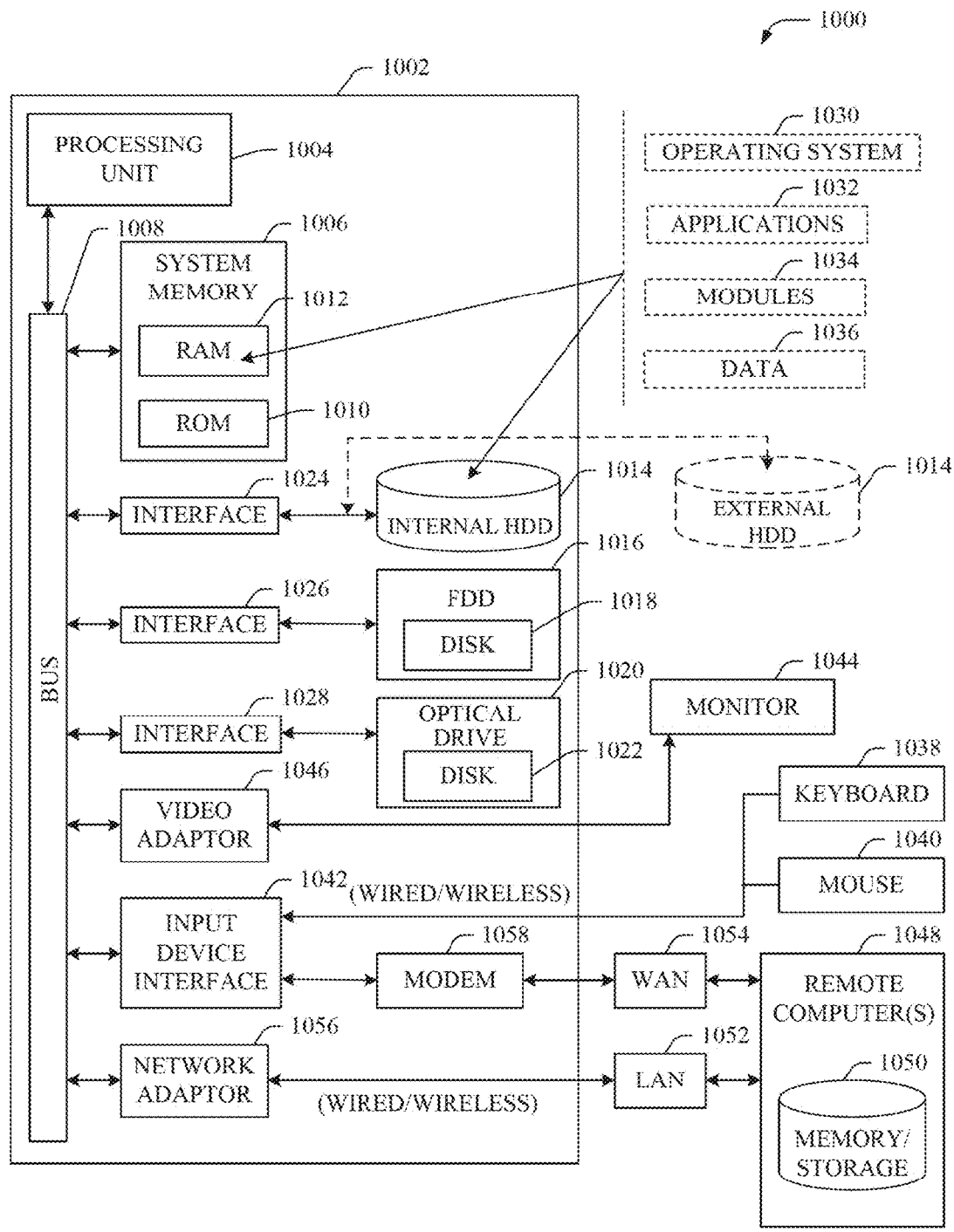
FIG. 10 illustrates a block diagram of a computer operable to facilitate processing for assignment of hierarchical cell structures employing geolocation techniques.

Referring now to FIG. 10, there is illustrated a block diagram of a computer operable to facilitate assignment of hierarchical cell structures employing geolocation techniques. For example, in some embodiments, the computer can be or be included within the sector assignment system 200.

In order to provide additional context for various embodiments of the embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a BS. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and a memory that stores executable instructions that, when executed by the processor, facilitate performance of operations, comprising:
  determining morphology data indicative of morphology information for a geographical region associated with a mobile device, the morphology data comprising first morphology data associated with terrain elements within the geographical region and second morphology data associated with a density of architectural structures within the geographical region; and
  assigning the mobile device to a base station device based on whether a distance between the mobile device and the base station device satisfies a defined criterion that varies as a function of the morphology data.

2. The system of claim 1, wherein the determining the morphology data comprises:
  determining third morphology data associated with a first type of the terrain elements within the geographic region; and
  determining fourth morphology data associated with a second type of the terrain elements within the geographic region.

3. The system of claim 2, wherein the operations further comprise:
  varying the defined criterion as a function of the second morphology data, the third morphology data and the fourth morphology data.

4. The system of claim 1, wherein the determining the morphology data comprises determining height data indicative of an average height of the terrain elements and the architectural structures within the geographical region.

5. The system of claim 4, wherein the determining the height data comprises:
  determining first height data associated with a first type of the terrain elements within the geographic region;
  determining second height data associated with a second type of the terrain elements within the geographic region; and
  determining third height data associated with the architectural structures within the geographic region.

6. The system of claim 5, wherein the operations further comprise:
  varying the defined criterion as a function of the first height data, the second height data and the third height data.

7. The system of claim 1, wherein the geographical region is a first geographical region, and wherein the determining the morphology data comprises receiving the morphology data from a storage device that stores the morphology data and geographical data indicative of information for a second geographical region associated with the base station device.

8. The system of claim 1, wherein the assigning comprises assigning the mobile device to a sector associated with the base station device based on whether the distance between the mobile device and the base station device satisfies the defined criterion.

9. The system of claim 1, wherein the assigning comprises:
  assigning the mobile device to a first sector associated with the base station device in response to a first determination that the distance between the mobile device and the base station device satisfies the defined criterion; and
  assigning the mobile device to a second sector associated with the base station device in response to a second determination that the distance between the mobile device and the base station device fails to satisfy the defined criterion.

10. The system of claim 1, wherein the operations further comprise:
  varying the defined criterion as a function of reflectivity information indicative of reflectivity of the architectural structures within the geographical region.

11. A method, comprising:
  determining, by a system comprising a processor, morphology information indicative of a morphology of terrain elements and a density of architectural structures within a geographical area associated with user equipment; and
  assigning, by the system, the user equipment to a cell site device, comprising determining whether a distance between the user equipment and the cell site device satisfies a defined criterion that varies as a function of the morphology information.

12. The method of claim 11, wherein the assigning further comprises assigning the user equipment to a sector of the cell site device based on a result of the determining whether the distance between the user equipment and the cell site device satisfies the defined criterion.

13. The method of claim 11, wherein the assigning further comprises:
  assigning the user equipment to a first sector of the cell site device in response to a first determination that the distance between the user equipment and the cell site device satisfies the defined criterion; and
  assigning the user equipment to a second sector of the cell site device in response to a second determination that the distance between the user equipment and the cell site device fails to satisfy the defined criterion.

14. The method of claim 11, further comprising:
  varying, by the system, the defined criterion as a function of reflectivity information indicative of roof reflectivity of the architectural structures for the geographical area.

15. The method of claim 11, further comprising:
  determining, by the system, geographical information indicative of a geographical location of the cell site device.

16. The method of claim 15, wherein the assigning comprises assigning the user equipment to the cell site device based on the geographical information.

17. A non-transitory machine-readable storage medium comprising executable instructions that, when executed by a processor, facilitate performance of operations, comprising:
  determining morphology information indicative of first morphology information for terrain elements and second morphology information associated with an amount of architectural structures at a location associated with a mobile device; and
  determining whether to assign the mobile device to a base station device based on whether a distance between the mobile device and the base station device satisfies a defined criterion that varies as a function of the morphology information.

18. The non-transitory machine-readable storage medium of claim 17, wherein the operations further comprise:
  varying the defined criterion based on reflectivity information indicative of reflectivity of the architectural structures.

19. The non-transitory machine-readable storage medium of claim 17, wherein the operations further comprise:

varying the defined criterion based on density information indicative of an amount of the terrain elements at the location.

20. The non-transitory machine-readable storage medium of claim 17, wherein the operations further comprise:
varying the defined criterion based on the second morphology information associated with the amount of the architectural structures at the location.

\* \* \* \* \*